United States Patent
Dobritz

[15] 3,669,134
[45] June 13, 1972

[54] METHOD FOR MIXING PRESSURE GASES PARTICULARLY FOR RESPIRATORS AND MEDICAL DEVICES

[72] Inventor: Gunter Dobritz, Lubeck, Germany

[73] Assignee: Drägerwerk Aktiengesellschaft, Lubeck, Germany

[22] Filed: June 11, 1970

[21] Appl. No.: 45,372

[30] Foreign Application Priority Data

June 20, 1969 Germany.....................P 19 31 354.3

[52] U.S. Cl..............................137/7, 128/145.8, 128/188, 137/100
[51] Int. Cl. .....................................G05d 11/00
[58] Field of Search........................137/1, 2, 3, 7, 12, 14, 87, 137/88, 98, 99, 100, 111; 128/142.2, 142.3, 145.6, 145.8, 147, 188

[56] References Cited

UNITED STATES PATENTS

| | | | |
|---|---|---|---|
| 2,527,136 | 10/1950 | Kagi et al. | 222/57 X |
| 2,788,953 | 4/1957 | Schneider | 137/111 X |
| 3,032,053 | 5/1962 | Ross et al. | 137/111 |
| 3,068,864 | 12/1962 | Tietze | 128/147 |
| 3,298,383 | 1/1967 | Cooper | 137/7 X |
| 3,515,155 | 6/1970 | Haffner et al. | 137/7 |
| 3,524,444 | 8/1970 | Ellard et al. | 137/111 X |
| 3,530,873 | 9/1970 | Arp et al. | 137/99 |

*Primary Examiner*—Samuel B. Rothberg
*Assistant Examiner*—David J. Zobkiw
*Attorney*—McGlew and Toren

[57] ABSTRACT

In a method for mixing two gases in a predetermined ratio, the two gases are supplied to respective chambers, having fixed or adjustable preselected volumes, through respective first pressure regulators while maintaining the discharge pressures of the two first pressure regulators in such predetermined ratio. The flow of the two gases to the chambers is then interrupted, and the two gases are thereafter discharged from the respective chambers to a common discharge line through respective second pressure regulators while maintaining the discharge pressures of the two second pressure regulators in such predetermined ratio. The apparatus includes adjustable means for conjointly adjusting both the first and second pressure regulators so that the discharge ratios thereof are equal and equal to the predetermined ratio. A reversing shut-off valve may be used to connect the chambers to the first pressure regulators or to discharge the chambers through the second pressure regulators. A magnetically biased torsion resistant lever may be used to commonly bias the pressures of the first and second pressure regulators and also to adjust the respective pressure ratios. The respective first and second pressure regulators for each gas may be combined into a single unit.

2 Claims, 4 Drawing Figures

3,669,134

INVENTOR
Günter Dobritz by

*McGlew & Toren*
ATTORNEYS

METHOD FOR MIXING PRESSURE GASES PARTICULARLY FOR RESPIRATORS AND MEDICAL DEVICES

BACKGROUND OF THE INVENTION

There are known methods and known apparatus for mixing gas currents. In one method, two pressure gases are expanded, each through a respective throttle valve and a respective flowmeter, into a common exhaust pipe, with the mixing ratio of the gases being adjusted in the flowmeters. This method has the disadvantage that the flowmeters and the throttle valves must be constantly monitored. Additionally, it must be assured that a certain pressure is always maintained in the flowmeters, as otherwise the readings of the flowmeters will not be correct. Thus, it is also necessary to maintain exactly a certain discharge gas pressure. In practice, this method can work satisfactorily only at flow velocities above a certain value, namely, in the so-called "supercritical range". This is a disadvantage, since this range cannot be maintained safely using simple means.

In another known method, two pressure gases are expanded to atmospheric pressure, drawn in by means of piston pumps having a variable stroke volume, and forced into the common discharge pipe. This method has the disadvantage that it requires a large amount of equipment, like piston pumps, drives therefor, and control devices.

SUMMARY OF THE INVENTION

This invention relates to the mixing of two gases in a predetermined ratio and, more particularly, to a novel method of and apparatus for performing such mixing and which permits the production of a mixture of two pressure gases, properly set to a certain ratio, utilizing simple means and avoiding the above-mentioned disadvantages.

In the method of the invention, each of the two gases to be mixed is supplied to a respective chamber having a predetermined or adjustable volume, through a separate pressure regulator. The pressure regulators are interconnected with each other in such a way that the discharge gas pressures thereof are in an adjustable predetermined ratio to each other, the two pressure regulators constituting what will be termed hereinafter a "first pressure ratio regulator". After such supplying of the two chambers, the gas flow is interrupted and the gases are discharged from the respective chambers through a second pressure ratio regulator which is set to the same pressure ratio as the first pressure ratio regulator, the second pressure ratio regulator discharging into the common discharge pipe for the gas mixture. With the invention method, it is possible to produce, with simple means, a gas mixture of a desired concentration ratio since a certain quantity or amount of each gas to be mixed is measured, after which the measured quantities are drawn off and mixed exactly according to the measured quantitative ratio.

In a simple form of the method, the two chambers have the same volume, and the ratio of the filling pressures of the gases to be mixed is set in accordance with the desired mixing ratio. With this arrangement, it is possible, with simple means, to set the mixing ratio to the respective required value.

In the invention apparatus, each chamber, having a preselected or adjustable volume, is connected, through a first pressure regulator and a first shut-off valve, to a feed or supply pipe, and is connected, through a second shut-off valve and an additional or second pressure ratio regulator to a common gas discharge pipe for the gas mixture. In using the apparatus of the invention, during the filling process, the chambers are filled with the gases to be mixed later in correspondence with the adjustable pressure ratio of the pressure ratio regulator. When the chambers are discharged, the gases expand through the shut-off valves and the second pressure ratio regulator into the mixture discharge pipe.

The pressure ratios of both pressure ratio regulators are adjustable, but the pressure ratios of both pressure ratio regulators are the same for a certain gas mixing ratio. The pressure ratio regulators can be arranged either upstream or downstream of the associated shut-off valves.

An object of the invention is to provide a simple and improved method for mixing two gases in a predetermined ratio.

Another object of the invention is to provide a simple and improved apparatus for mixing two gases in a predetermined ratio.

A further object of the invention is to provide such a method and apparatus in which the two gases are supplied to respective chambers through a first pressure ratio regulator, the flow of the two gases is interrupted, and the two gases are discharged through a second pressure ratio regulator.

Another object of the invention is to provide such a method and apparatus in which the ratios of the two pressure regulators are maintained equal to each other and equal to the desired predetermined ratio of the gas mixture.

For an understanding of the principles of the invention, reference is made to the following description of typical embodiments thereof as illustrated in the accompanying drawing.

DESCRIPTION OF THE PREFERRED EMBODIMENTS

Figure 1:
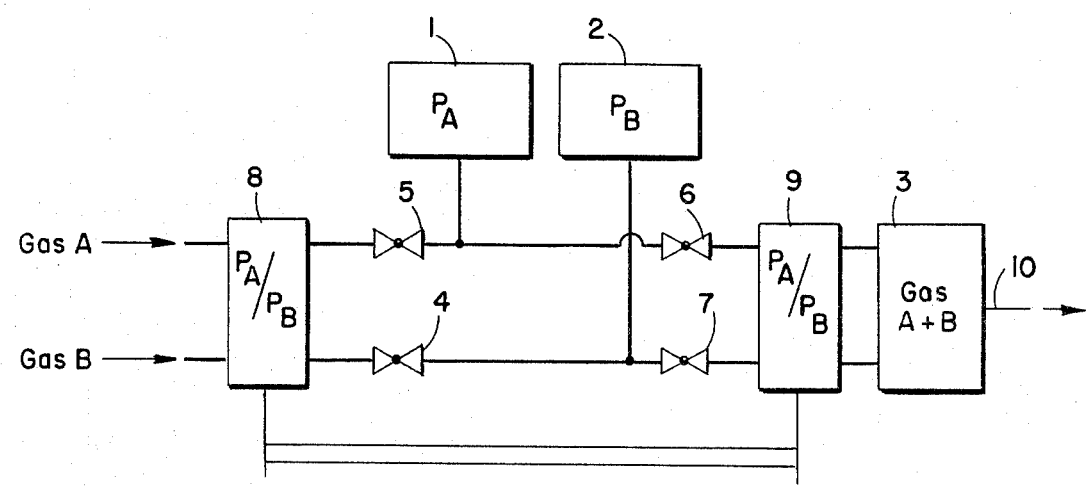
FIG. 1 is a schematic flow diagram illustrating the apparatus of the invention.

Referring first to FIG. 1, chambers 1 and 2 are filled periodically with a preselected or adjustable volume of the pressure gases A and B, and are subsequently discharged into storage tank 3 and thence into gas mixture mixture discharge pipe 10. During filling of chambers 1 and 2, the two shut-off valves 6 and 7 are closed and the two shut-off valves 4 and 5 are open, so that pressure gases A and B can flow into respective chambers 1 and 2 through pressure ratio regulator 8. The ratio of the pressures in chambers 1 and 2 depends on the setting of pressure ratio regulator 8. After closing shut-off valves 4 and 5 and opening shut-off valves 6 and 7, discharge of the chambers is effected through pressure ratio regulator 9, which must be set to the same pressure ratio as that to which pressure ratio regulator 8 is set. Discharge is effected into storage tank 3 and from there into mixture discharge pipe 10. As a rule, only one chamber is expanded to the pressure in the discharge pipe, while the other maintains a residual pressure corresponding to the set pressure ratio.

Figure 2:
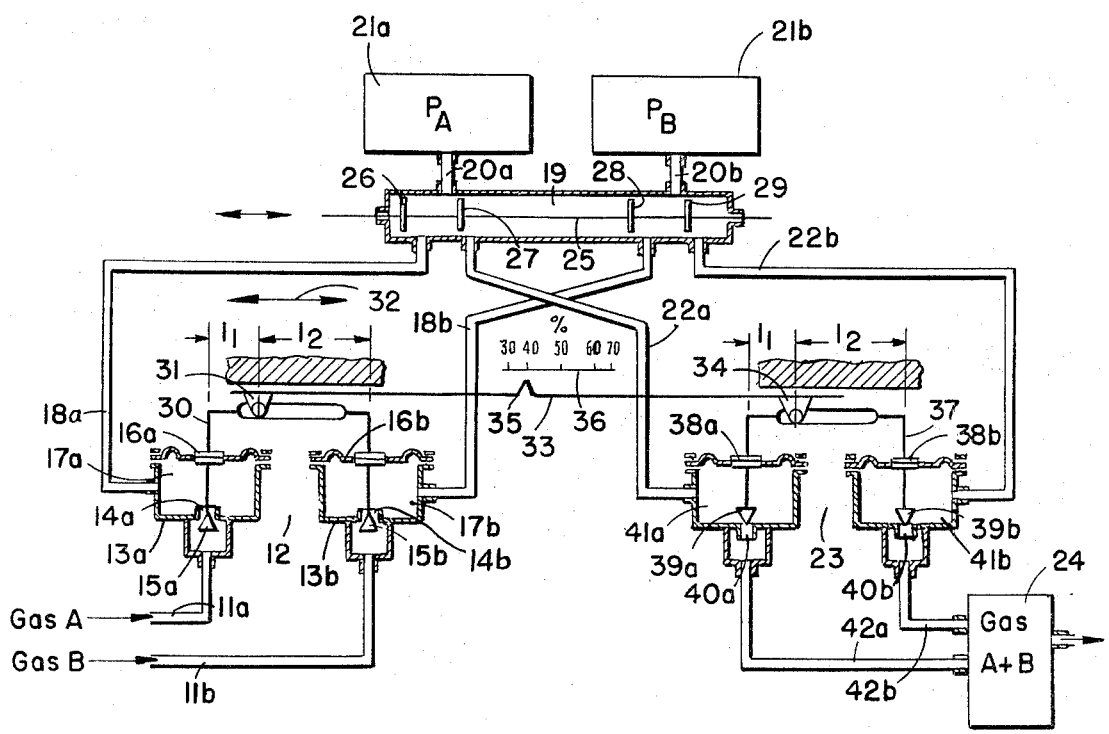
FIGS. 2 and 3 are part schematic, part sectional and part perspective views illustrating alternative embodiments of the apparatus of the invention.

In the embodiment of the invention shown in FIG. 2, the two pressure gas pipes 11a and 11b, through which the gases A and B are supplied, lead to pressure ratio regulator 12. The latter comprises two housings 13a and 13b having inlet ports 14a and 14b which form valve seats for the respective moving valve bodies 15a and 15b. The valve bodies are connected with the respective control diaphragms 16a and 16b which close the pressure chambers 17a and 17b. Pipes or conduits 18a and 18b lead from pressure chambers 17a and 17b, respectively, to the gas distributor which contains the shut-off valves, and which are represented, in FIG. 2, as a reversing valve 19.

Reversing valve 19 can be designed in various ways, and its function is to connect lines 18a and 18b simultaneously either with the respective lines 20a and 20b, leading to chambers 21a and 21b having either the same or different volumes, or to interrupt this connection and simultaneously to connect pipes or lines 20a or 20b to pipes or lines 22a and 22b which lead, through an additional pressure ratio regulator 23, to storage tank 24.

In the illustrated embodiment, reversing valve 19 is designed as a slide valve where the port communicating with line 20a is arranged between the ports communicating with lines 18a and 22a and the port leading to line 20b is arranged between the ports communicating with lines 18b and 22b. Reversing valve 19 is controlled by control rod 25 on which there are secured the shut-off discs 26, 27, 28 and 29. In the represented position, lines 18a and 18b are connected to respective lines 20a and 20b. When control rod 25 is moved into its other position, lines 20a and 20b are connected with the respective lines 22a and 22b.

Diaphragms 16a and 16b of pressure ratio regulator 12 are connected with each other through a rocker arm 30 whose bearing 31 can be displaced in the direction of the double arrow 32. By such displacement, the ratio of the lever arms $l_1$ and $l_2$ can be adjusted, and the pressure ratio in pressure chambers 17a and 17b thus can be set. Diaphragms 16a and 16b which are subjected, on one side, to the gas pressure in chambers 17a and 17b, respectively, and are subjected on the opposite side with any desired but constant pressure, for example, atmospheric pressure. The pressure ratio in chambers 17a and 17b is established in accordance with the following equation:

Equation 1: $\quad l_1 (P_A - P_{const}) = l_2 (P_B - P_{const})$

Since bearing 31 is connected by a member 33 with bearing 34, the same pressure ratio is set in both pressure ratio regulators 12 and 23. The adjusted position of connecting member 33 is indicated by a pointer 35 on a scale 36, and shows the setting of the pressure ratio of both pressure ratio regulators 12 and 23.

A rocker 37, having the bearing 34, connects control diaphragms 38a and 38b of pressure ratio regulator 23, on which are secured the respective moving valve bodies 39a and 39b. These valve bodies cooperate with the valve seats formed by the outlet ports 40a and 40b of the respective housings 41a and 41b. The pressure chambers of housings 41a and 41b are connected with storage tank 24 by respective discharge lines 42a and 42b.

The method of operation of this embodiment of the apparatus will now be described. In the represented position of reversing valve 19, pressure gases A and B flow through lines 11a and 11b, respectively, through respective inlet ports 14a and 14b and into the respective pressure chambers of housings 17a and 17b. From there the gases flow through the respective lines 18a and 18b, through reversing valve 19, and through respective lines 20a and 20b into respective chambers 21a and 21b. The final pressure in chambers 21a and 21b is formed in accordance with equation 1. After chambers 21a and 21b have been filled, they can be discharged into storage tank 24 by switching reversing valve 19. Discharge is effected through respective pipe lines 20a and 21b, reversing valve 19, respective lines 22a and 22b, the pressure chambers of respective housings 41a and 41b, respective outlet ports 40a and 40b, and respective pipes or lines 42a and 42b. During the discharge of the chambers, the pressure ratio regulator 23 also satisfies equation 1 for the chambers 21a and 21b.

Switching of reversing valve 19 can be effected in dependence on time, and can be controlled, for example, in dependence on a time signal transmitter. However, reversing valve 19 also can be controlled in dependence on the pressure in chambers 21a and 21b, or in dependence on the pressure in storage tank 24, or in response to other control quantities.

Figure 3:
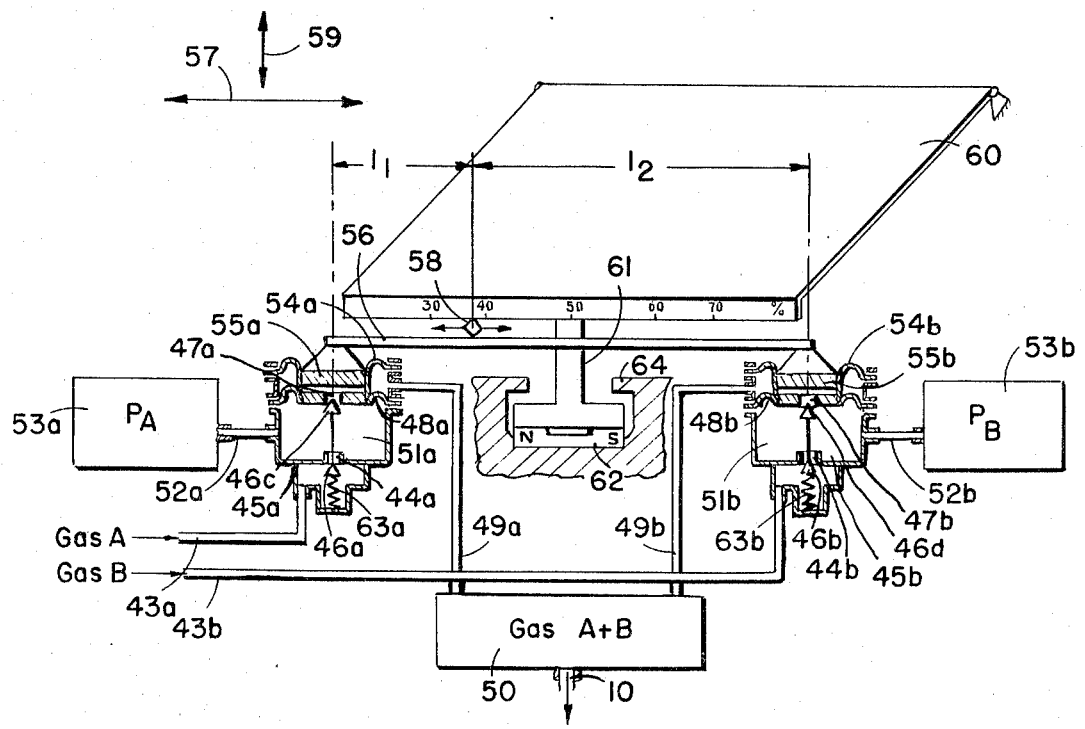

The embodiment of the invention illustrated in FIG. 3 differs from that illustrated in FIG. 2 in that the two pressure ratio regulators 12 and 23, as well as the reversing valve 19, are combined to form a unit. Referring to FIG. 3, pressure gas pipes 43a and 43b, through which the respective gases A and B are supplied, carry the respective inlet ports 44a and 44b of respective housings 45a and 45b, and which inlet ports form the valve seats for the respective valve bodies 46a and 46b loaded by respective springs 63a and 63b. The outlet ports 47a and 47b in the respective diaphragms 48a and 48b, forming the valve seats of the respective additional valve bodies 46c and 46d connected fixedly with respective valve bodies 46a and 46b, are connected with storage tank 50. The pressure chambers 51a and 51b of the respective housings 45a and 45b are connected through respective lines 52a and 52b with respective chambers 53a and 53b of a preselected or adjustable volume. The two double diaphragms, one comprising diaphragms 48a and 54a interconnected by bridge 55a, and the other comprising diaphragms 48b and 54b, interconnected by bridge 55b, are connected with each other through a rocker 56. Rocker 56 has a bearing point 58 which can be displaced in the direction of the arrow 57, and which can assume two end positions, fixed in the directions of the arrow 59 in dependence on the force acting on this bearing, and which force is produced by the differential pressures on the double diaphragms 48a, 54a, and 48b, 54b. In the embodiment of FIG. 3, this force is provided by the bearing point 58 bearing against a torsion-resistant lever 60 connected with an iron bridge 61 which is under the influence of a magnet 62 which tends to pull bridge 61 downwardly. The upper limit of movement is provided by a stop 64.

The embodiment of the invention shown in FIG. 3 operates in a manner which will now be described. With lever 60 in the represented position, pressure gases A and B flow through respective pipes 43a and 43b through respective inlet ports 44a and 44b into the respective pressure chambers 51a and 51b, and then through respective lines 52a and 52b into the respective chambers 53a and 53b. During the filling, the pressure ratio in chambers 53a and 53b is established, at any time, according to equation 1. If the sum of the forces produced by the differential pressures on double diaphragms 48a, 54a and 48b, 54b exceeds the holding force exerted by magnets 62, lever 60 is biased into the upper end position in the direction of the arrow 59. In this position, inlet ports 44a and 44b are closed by the respective valve bodies 46a and 46b biased by respective springs 63a and 63b. The pressure gases can expand through the simultaneously opened outlet ports 47a and 47b from chambers 53a and 53b, respectively, through lines 52a and 52b, respectively, the respective pressure chambers 51a and 51b, the respective outlet ports 47a and 47b, and the respective lines 49a and 49b into the storage tank 50. During such discharge of the gases, the pressure ratio in chambers 53a and 53b is satisfied, at any time, by equation 1. If the sum of the forces produced by the differential pressures on the double diaphragms 48a, 54a and 48b, 54b are less than the holding force exerted by magnets 62, lever 60 is biased into he downward end position in the direction of arrow 59, and a new filling operation is initiated.

Figure 4:
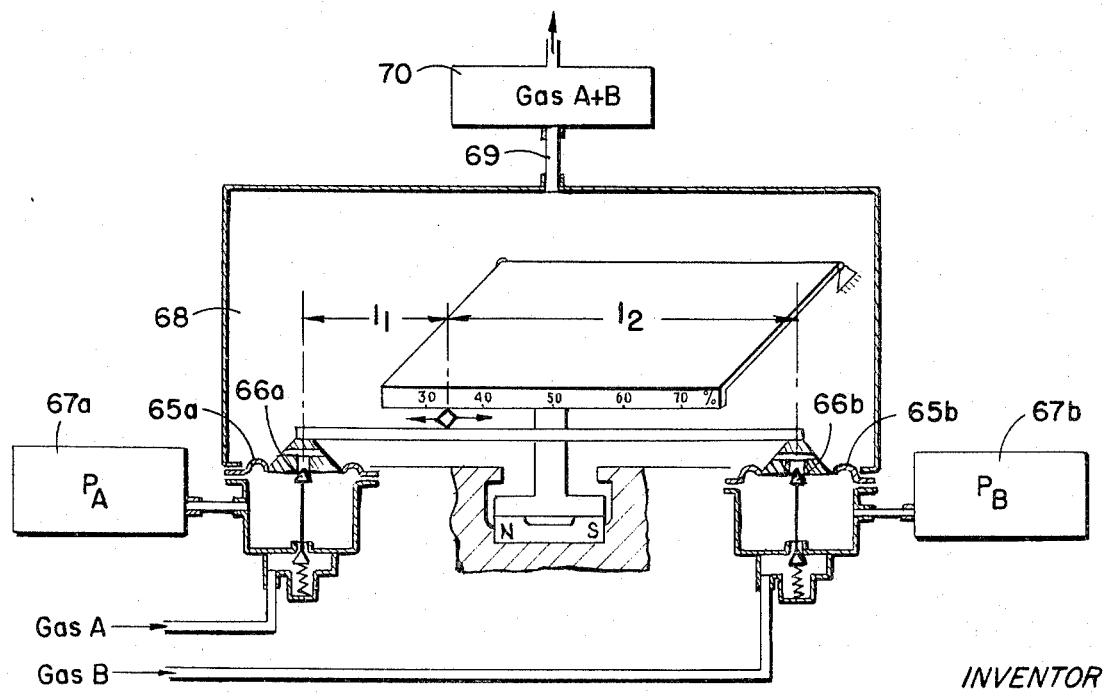
FIG. 4 is a view similar to FIGS. 2 and 3 illustrating a simplified form of the apparatus shown in FIG. 3.

FIG. 4 illustrates a simplification of the embodiment illustrated in FIG. 3. Double diaphragms 48a, 54a and 48b, 54b are now formed as single diaphragms 65a and 65b, respectively, having respect outlet ports 66a and 66b which permit the passage of gases, during discharge from respective chambers 67a and 67b to flow through container or enclosure 68 and discharge pipe 69 into storage tank 70. The exact pressure ratio according to equation 1 is met, however, only if the back pressure on diaphragms 65a and 65b is constant. Care therefore must be taken so that, by proper dimensioning of the apparatus, the back pressure on diaphragms 65a and 65b remains practically constant during the filling and during the discharge.

While specific embodiments of the invention have been shown and described in detail to illustrate the application of the principles of the invention, it should be understood that the invention may be embodied otherwise without departing from such principles.

What is claimed is:

1. A method for mixing two gases in a predetermined ratio, comprising the steps of supplying the two gases to respective chambers, having respective preselected volumes, through respective first pressure regulators while maintaining the discharge pressures of the two first pressure regulators in such predetermined ratio; simultaneously interrupting the flow of both gases into the respective chambers; and thereafter discharging the two gases from the respective chambers to a common discharge line through respective second pressure regulators while maintaining the discharge pressures of the two second pressure regulators in such predetermined ratio.

2. A method as claimed in claim 1, in which the chambers have the same preselected volume and are filled to respective pressures having such predetermined ratio.

* * * * *